(12) United States Patent
Styron

(10) Patent No.: US 7,028,647 B2
(45) Date of Patent: Apr. 18, 2006

(54) VARIABLE COMPRESSION RATIO CONNECTING ROD FOR INTERNAL COMBUSTION ENGINE

(75) Inventor: Joshua P. Styron, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/707,751

(22) Filed: Jan. 9, 2004

(65) Prior Publication Data
US 2005/0150471 A1    Jul. 14, 2005

(51) Int. Cl.
F02B 75/04    (2006.01)
(52) U.S. Cl. .................................................. 123/48 B
(58) Field of Classification Search ............. 123/48 B, 123/48 R, 78 E, 78 F, 197.3, 197.4
See application file for complete search history.

(56) References Cited

U.S. PATENT DOCUMENTS

| | | | |
|---|---|---|---|
| 2,287,472 A * | 6/1942 | Eby | 74/44 |
| 3,859,976 A | 1/1975 | McWhorter | |
| 3,908,623 A | 9/1975 | McWhorter | |
| 4,085,628 A * | 4/1978 | McWhorter | 74/579 E |
| 4,089,235 A * | 5/1978 | McWhorter | 74/579 E |
| 4,203,406 A | 5/1980 | Smith | |
| 4,370,901 A * | 2/1983 | Bolen | 74/586 |
| 4,567,866 A | 2/1986 | Schubert | |
| 4,834,031 A | 5/1989 | Katoh et al. | |
| 4,890,588 A | 1/1990 | Tillman | |
| 4,974,554 A | 12/1990 | Emery | |
| 5,245,962 A | 9/1993 | Routery | |
| 5,562,068 A | 10/1996 | Sugimoto et al. | |
| 5,791,302 A * | 8/1998 | Ma | 123/48 B |
| 6,202,622 B1 * | 3/2001 | Raquiza, Jr. | 123/197.4 |
| 2003/0075125 A1 | 4/2003 | Kreuter | |
| 2003/0089320 A1 | 5/2003 | Styron et al. | |

FOREIGN PATENT DOCUMENTS

| | | |
|---|---|---|
| EP | 1 426 584 A1 | 9/2004 |
| FR | 2 714 941 A1 | 1/1994 |
| GB | 2 193 282 A | 2/1988 |
| GB | 2 288 864 A | 1/1995 |
| WO | WO 95/08705 | 3/1995 |

* cited by examiner

Primary Examiner—Henry C. Yuen
Assistant Examiner—Hyder Ali
(74) Attorney, Agent, or Firm—Diana D. Brehob; Artz & Artz, P.C.

(57) ABSTRACT

A variable compression ratio connecting rod for an internal combustion engine includes a large end adapted for attachment to a crankshaft and a small end adapted for attachment to a piston. An adjustable four-bar link system extends between and links the large end and the small end so as to permit the length of the connecting rod to be adjusted through the action of an adjustable toggle link and an eccentric which is driven by inertia forces acting upon the connecting rod.

15 Claims, 11 Drawing Sheets

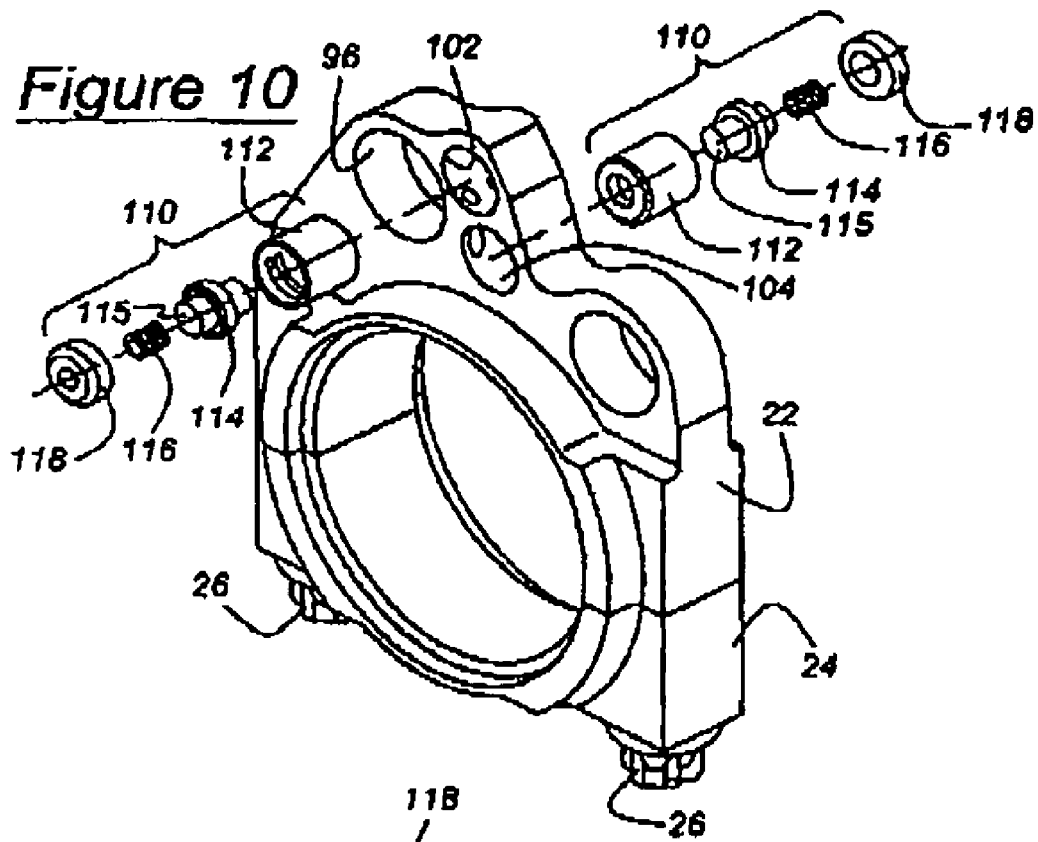

VARIABLE COMPRESSION RATIO CONNECTING ROD FOR INTERNAL COMBUSTION ENGINE

This is a companion case of U.S. application Ser. No. 10/707,755 filed January 9, 2004, which is hereby incorporated by reference into this specification.

BACKGROUND OF INVENTION

1. Field of the Invention

The present invention relates to a connecting rod for a reciprocating internal combustion engine in which the effective length of the connecting rod may be controllably varied so as to change the compression ratio of the engine.

2. Disclosure Information

Students of thermodynamics understand that, in general, higher compression ratios yield higher thermal efficiency for piston-type internal combustion engines. Unfortunately, with premixed charge engines, most commonly sold in the form of spark-ignited engines operated on gasoline, higher compression ratios may cause problems arising from pre-ignition. This problem may be exacerbated, moreover, when an engine is turbocharged or super-charged. Therefore, it would be desirable to have an engine which can normally be operated at a higher compression ratio at most operating conditions, so as to yield maximum fuel economy, while still allowing operation at lower compression ratio at the highest power conditions. This would allow the engine to produce maximum power without knock or preignition. The inventor of the present connecting rod has provided a unique solution to problems associated with known variable compression ratio arrangements. Such arrangements as pistons with variable compression height, typically developed by BICERI, as well as a variable plethora of other mechanical devices all suffer from problems relating to controllability, inadequate time response, excessive weight, excessive complexity, and other issues. The present connecting rod solves the problems associated with prior compression ratio controlling devices by using a mechanism which starts with a four-bar linkage extending between the large and small ends of the connecting rod and which utilizes inertia forces to obtain the required compression ratio changes, while employing a locking mechanism which need only withstand the buckling forces imposed upon the four-bar link mechanism to maintain the connecting rod at the selected compression ratio.

SUMMARY OF INVENTION

A variable compression ratio connecting rod for an internal combustion engine includes a large end adapted for attachment to a crankshaft and a small end adapted for attachment to a piston. An adjustable four-bar system extends between and links the large end and the small end so as to permit the length of the connecting rod to be adjusted. The four-bar system preferably comprises a primary link extending between the large end and the small end, with the primary link pivotably attached to the large end, and an adjustable toggle link having a first end pivotably attached to the primary link and a second end pivotably attached to an eccentric journaled within the large end. The rotational position of the eccentric determines the length, or more properly, the effective length of the connecting rod.

According to another aspect of the present invention, the eccentric housed within the large end of the rod is selectively positionable in a plurality of rotational positions, with each such position corresponding to a different connecting rod effective length, and hence, a range of compression ratios for the engine.

The position of the eccentric is controlled by a latching device mounted within the large end of the connecting rod, with the latching device being controllable so as to rotationally lock the eccentric. The latching device may comprise at least one lock pin mounted within the large end of the connecting rod, with the lock pin being controllably extendable into registry with at least one aperture formed in the adjustable toggle link, so as to rotationally lock the eccentric. The latching device preferably comprises a plurality of lock pins mounted within the large end, with the lock pins being controllably extendable into registry with a plurality of apertures formed in the adjustable toggle link, so as to selectively lock the eccentric into one of a plurality of rotational positions, with each of the rotational positions corresponding to a unique compression ratio. In a preferred embodiment, each of the lock pins comprises a double-acting hydraulic plunger having a pin end, with the plunger being housed within a cartridge which is itself mounted in the large end of the connecting rod, with the plunger being acted upon by both a spring force and a hydraulic force extending the pin and hydraulic force alone for retracting the pin.

According to another aspect of the present invention, each of the apertures engaged by the lock pins housed within the cartridges comprises a generally circular bore having a initial engagement portion, with the initial engagement portion having a non-circular configuration extending about and beyond the generally circular bore. This guide region promotes initial engagement of the pin and effectively "funnels" the locking pin into its final seated position in a bore or aperture extending into one portion of the adjustable toggle link.

According to another aspect of the present invention, a latching device associated with a variable compression ratio connecting rod is actuated by engine lubricating oil supplied by passages formed in a crankshaft to which the connecting rod is attached. In this regard, U.S. Pat. No. 6,408,804, which is assigned to the assignee of the present invention, is hereby incorporated by reference into this specification.

According to another aspect of the present invention, a method for adjusting the length of a variable compression ratio internal combustion engine connecting rod includes the steps of determining a desired compression ratio state for the connecting rod and detecting the contemporaneous compression ratio state of the connecting rod and in the event that the detected state is not the desired state, unlocking a latch positioned between the large end of the connecting rod and an adjustable toggle link extending between a primary link of the connecting rod and an eccentric journaled within the large end, so as to allow inertia forces acting upon the connecting rod to cause the toggle link to change the rotational position of the eccentric, which causes the rotational position of the primary link with respect to the large end of the rod to change, thereby changing the effective length of the connecting rod, and finally, re-locking the latch so as to maintain the connecting rod at the adjusted length. The present method also includes detecting the contemporaneous compression ratio state of the connecting rod following an adjustment of the connecting rod length.

It is an advantage of the present connecting rod that an engine compression ratio may be changed in a robust manner so as to provide superior control of the compression ratio of the engine.

It is a further advantage of the present invention that the present connecting rod allows provision of a variable compression ratio with less weight and less complexity as compared with prior art mechanisms.

It is a further advantage of the present invention that the present adjustable connecting rod allows rapid changing of the compression ratio.

Other advantages, as well as objects and features of the present invention, will become apparent to the reader of this specification.

BRIEF DESCRIPTION OF DRAWINGS

FIG. 10 is a partial exploded perspective showing locking pins in a connecting rod according to the present invention.

FIG. 11 is a perspective view showing locking pins mounted in the large end of a connecting rod according to the present invention.

DETAILED DESCRIPTION

Figure 1:
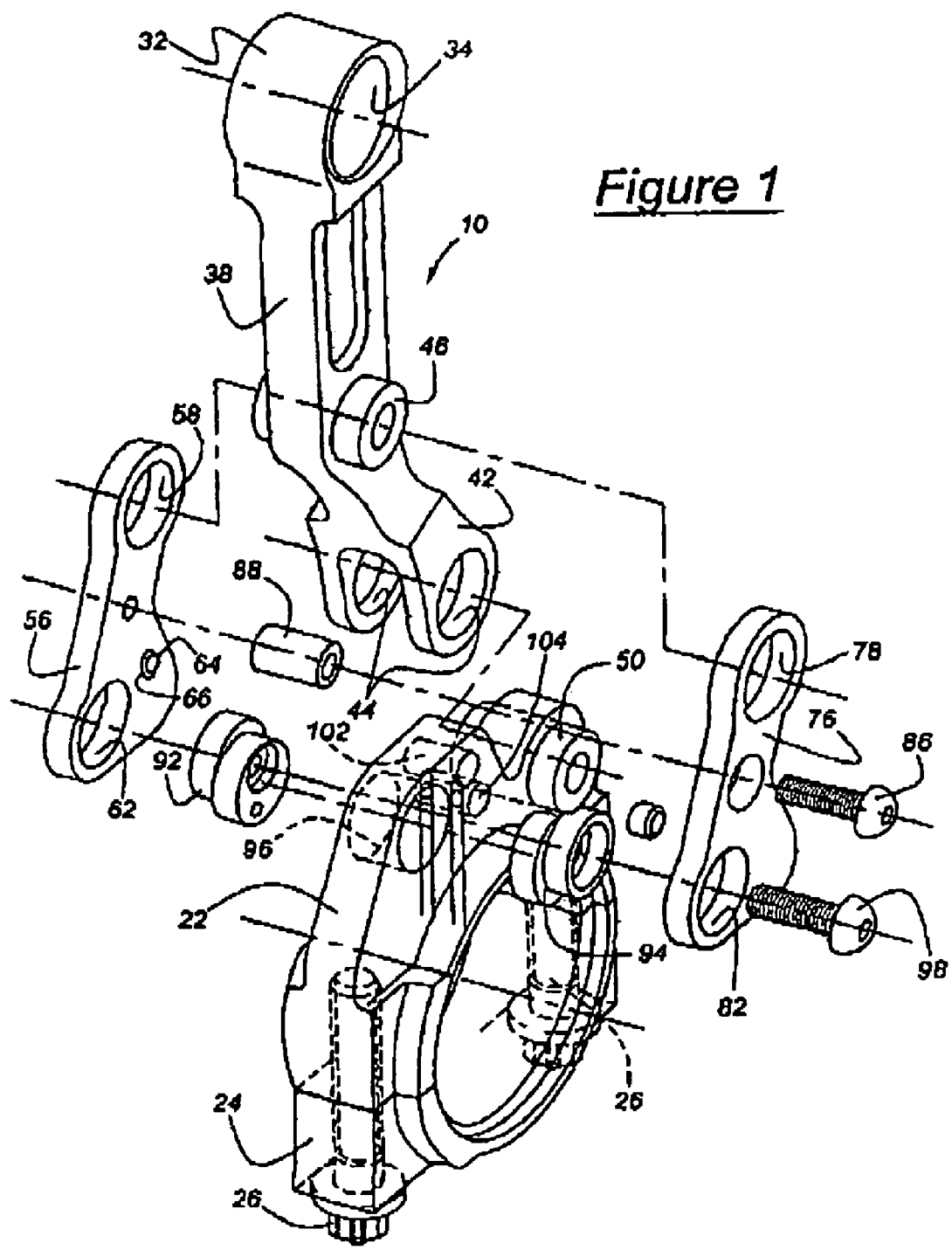
FIG. 1 is an exploded perspective view of a connecting rod according to the present invention.

As shown in FIG. 1, connecting rod 10 according to the present invention has large end 22 adapted for attachment to the crankshaft (not shown) of an engine, and small end 32 having a wrist pin bore 34 for attaching connecting rod 10 to an engine piston (not shown). Connecting rod cap 24 and screws 26 maintain connecting rod 10 in contact with a crankshaft journal in conventional fashion.

Primary link 38 extends between small end 32 and large end 22. One end of primary link 38 is integral with small end 32, and the other end 42 comprises a fork with two bores 44 which accept pin 50 so as to allow primary link 38 to be pivotably attached to large end 22. Primary link 38 comprises one part of a four-bar link system extending between small end 32 and large end 22. The second portion of the four-bar link is comprised by an adjustable toggle link which is formed by low compression link 56 and high compression link 76. Beginning now with low compression link 56 it is seen from FIGS. 1 and 14 that link 56 has a primary link engaging bore 58 which allows pivotal mounting upon pivot 46 which is mounted within primary link 38. This allows the adjustable toggle link to be pivotally attached to primary link 38. The second end of low compression link 56 has a bore 62 which permits mounting upon eccentric 92 which is housed within large end 22 of connecting rod 10. Eccentric 92 is mounted within a bore 96 formed in large end 22.

Figure 12:
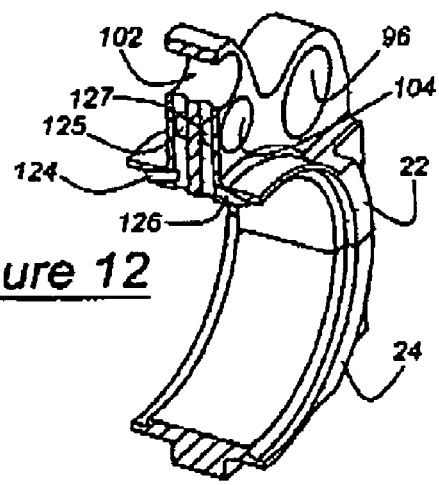
FIG. 12 is a perspective view partially broken away showing with particularity oil passages according to an aspect of the present invention.

As shown in the various figures, large end 22 has two bores, 102 and 104, which comprise low compression lock pin bore 102 and high compression lock pin bore 104. FIGS. 10, 11 and 12 show details of the lock pin bores and lock pins. Continuing with FIG. 12, passage 124 is the high compression lock pin passage. Thus, oil arising from a passage in the crankshaft (not shown) and coming through a drilling in the crank journal at the edge of the bearing insert within large end 22 will proceed through passage 124 and into bores 104 and 102. Pressurized oil from passage 124 will cause the lock pin housed within bore 102 to be retracted, while at the same time the lock pin housed within bore 104 will be extended, so as to engage high compression link 76 (FIG. 1). As with low compression link 56, high compression link 76 is pivotably attached to pivot post 46 on primary link 38 and is also pivotably attached to eccentric 94, which is housed within bore 96 in large end 22. Screws 86 and 98 serve to mount high compression link 76 to low compression link 56. Screw 98 serves to attach the two eccentric halves 92 and 94.

Figure 14:
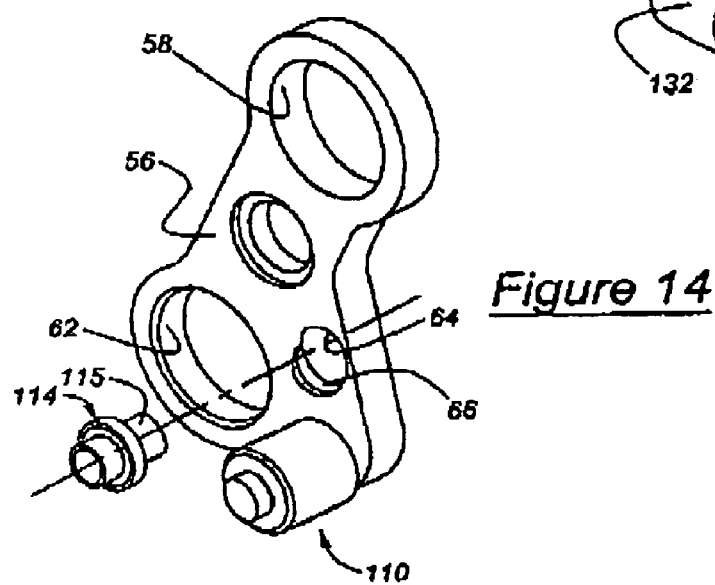
FIG. 14 illustrates a high compression link and associated hardware according to one aspect of the present invention.

Details of the lock pin construction are shown in FIG. 10. Thus, each cartridge 110 has a housing 112 which contains plunger 114 and having an end 115 comprising a pin. Each plunger is backed by a spring 116 and held in place by a retainer 118 within housing 112. Cartridges 110 are mounted within bores 102 and 104 as shown in FIG. 11. Oil passing through passage 124 (FIG. 12) causes plunger 114 within the cartridge mounted in bore 104 to extend from the housing 112. This extension is aided by spring 116. Pin 115 on the end of plunger 114 will extend into a lock pin aperture formed in high compression link 76. Details of lock pin aperture 64 formed in low compression link 56 are shown in FIGS. 1 and 14. These details are mimicked by the aperture formed in high compression link 76. As shown in FIGS. 1 and 14, lock pin aperture 64 is a generally cylindrical bore having a guide region 66 formed as a partially relieved region around a portion of lock pin aperture 64. Thus, when lock pins 115 are extended from cartridges 110, the lock pins will first extend into the relieved area of guide region 66 and then, in essence, "funnel" into bore 64.

Oil entering passage 126 (FIG. 12) causes the lock pin 115 housed within cartridge 110 mounted within bore 102 to be extended into aperture 64 formed in low compression link 56, thereby causing connecting rod 10 to assume its shorter, or low compression, position. Conversely, when the pin extending from bore 104 is engaged, connecting rod 10 will be locked in a longer, or higher, compression position. As noted above, low compression link 56 and high compression link 76 comprise a second portion of the four-bar link system. A third portion of the four-bar link is comprised by a portion of eccentrics 92 and 94. This portion is shown with particularity in FIGS. 2 through 9 inclusive, in which the rotation of eccentric 94 is shown with particularity. Thus, in FIG. 2, connecting rod 10 is in a maximum compression configuration and eccentric 94 is shown as being positioned so as to define a triangular geometry between points the centers of pivot post 46, pin 50, and bore 96. In FIG. 3, the four-bar feature of the present inventive connecting rod is clearly shown, with the first link extending from center A of pin 46, and the second link extending from center A to center B of eccentric 94. The third link extends from center B to center C of bore 96, and the fourth link extends from center C to center D of pin 50. Those skilled in the art will appreciate in view of this disclosure that a plurality of compression ratios may be accommodated by locking eccentric 94 in different rotational positions.

Figure 2:
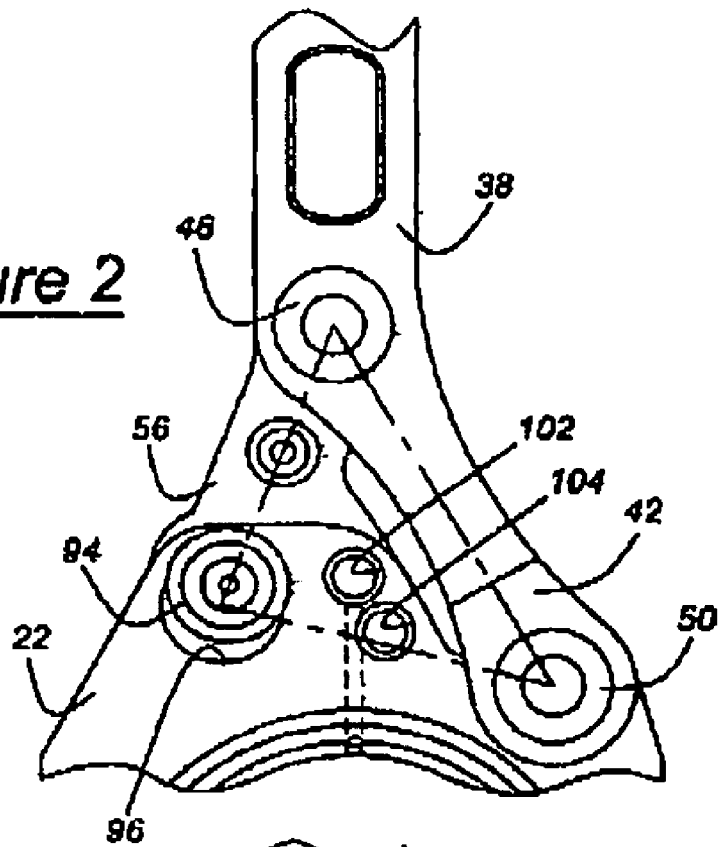
FIGS. 2–9 show the locations of an eccentric forming part of the four-bar link incorporated in a connecting rod according to the present invention, as the eccentric is rotated into various positions corresponding to changes in the rod''' effective length, and hence the compression ratio produced by the present connecting rod.
Figure 3:
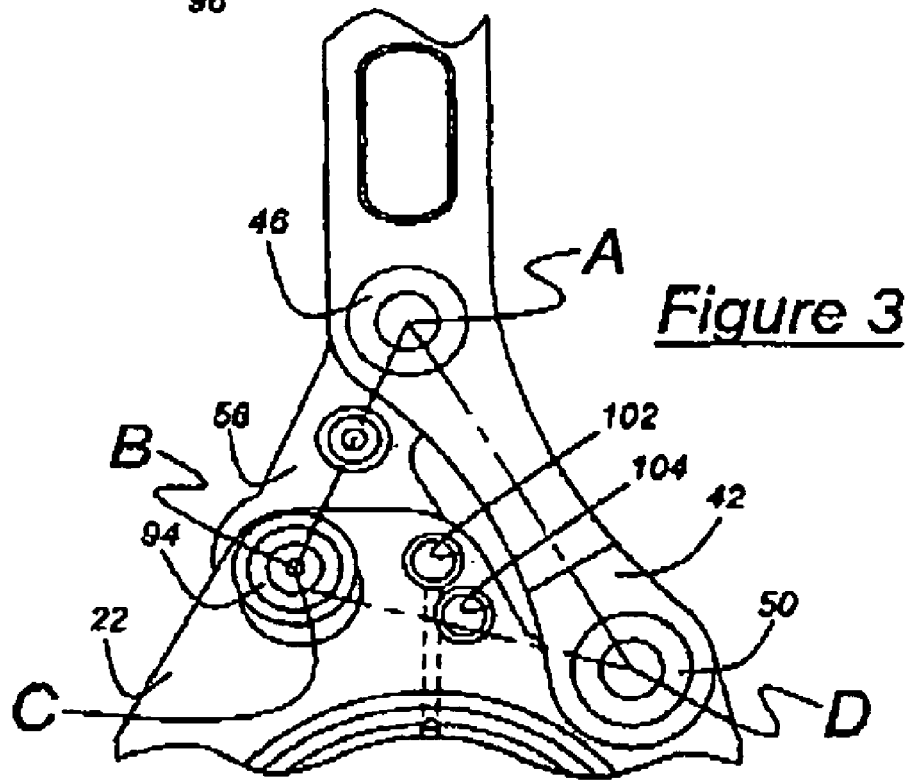
Figure 4:
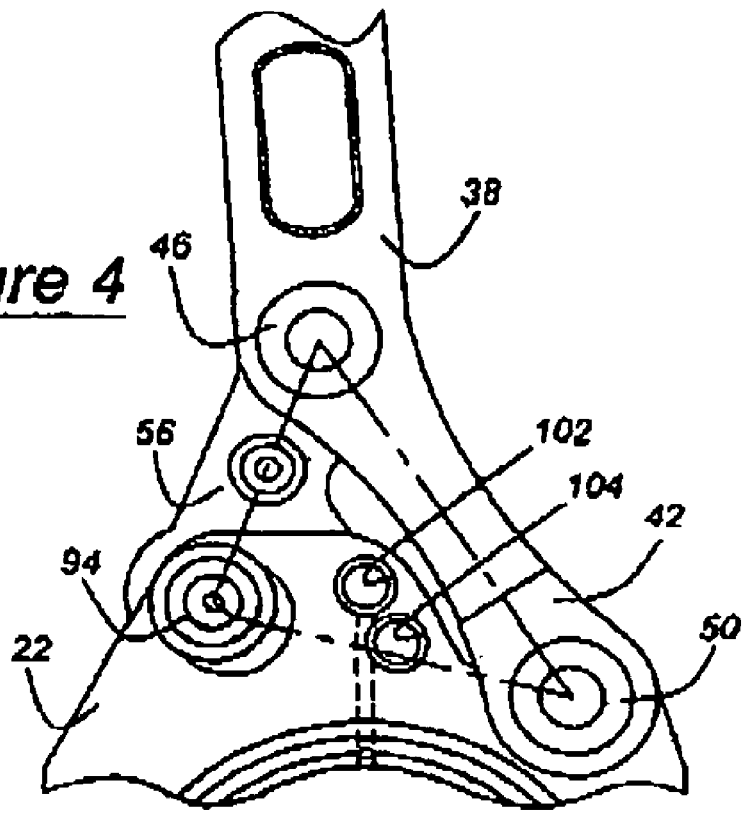
Figure 5:
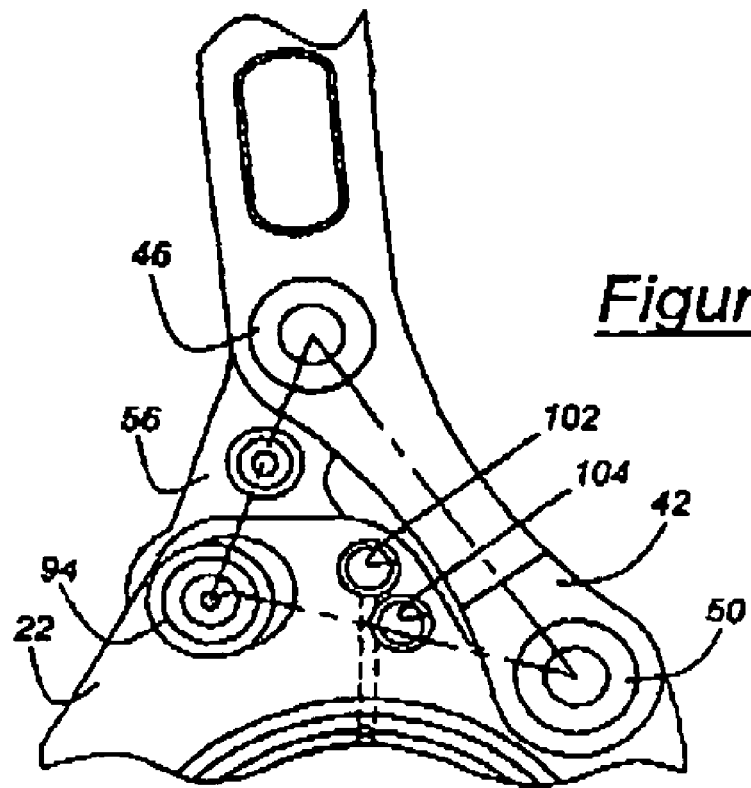
Figure 6:
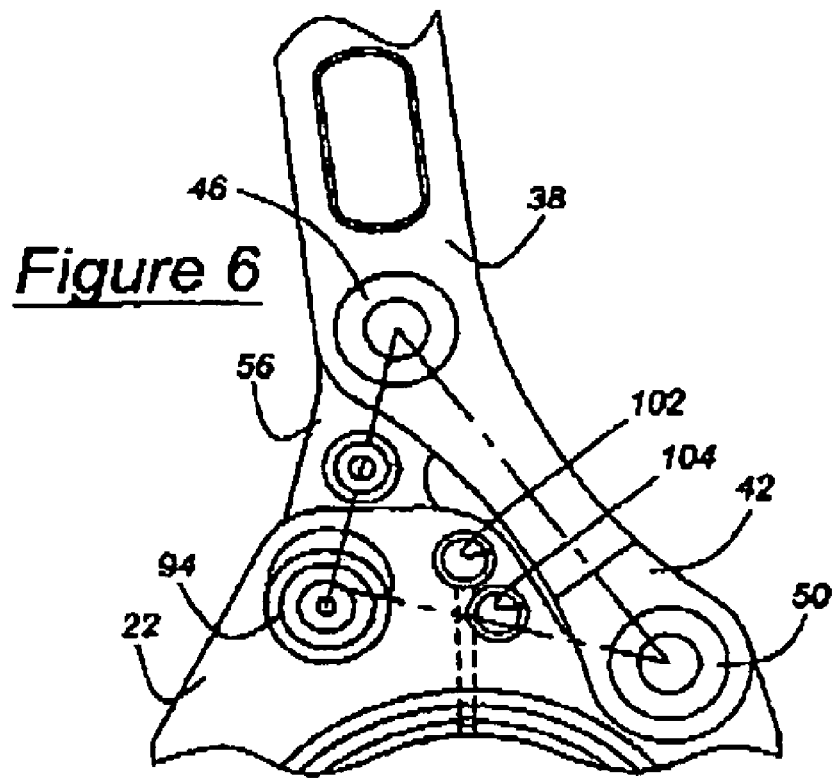
Figure 7:
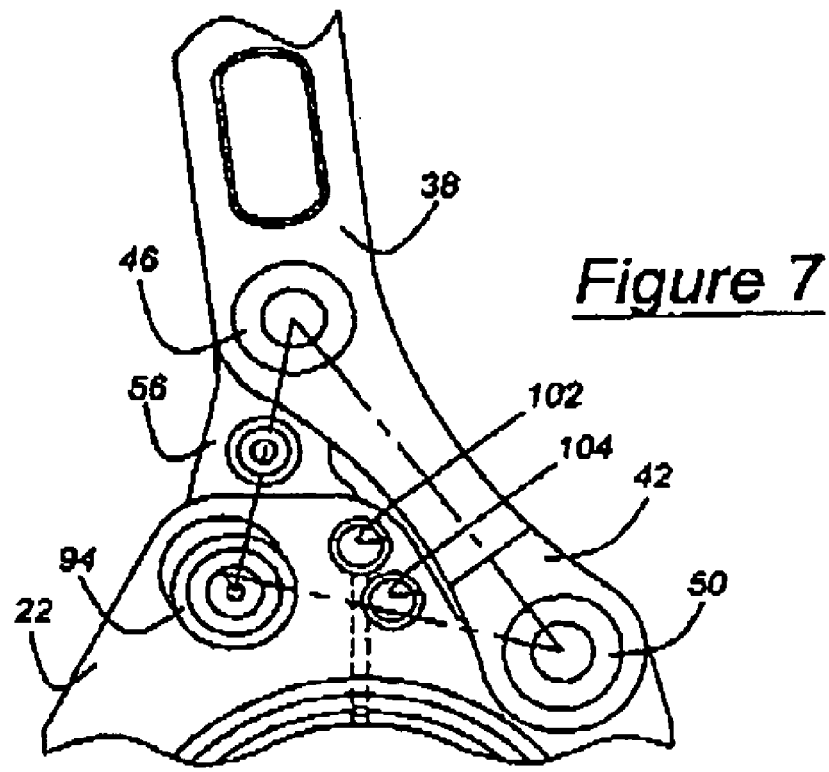
Figure 8:
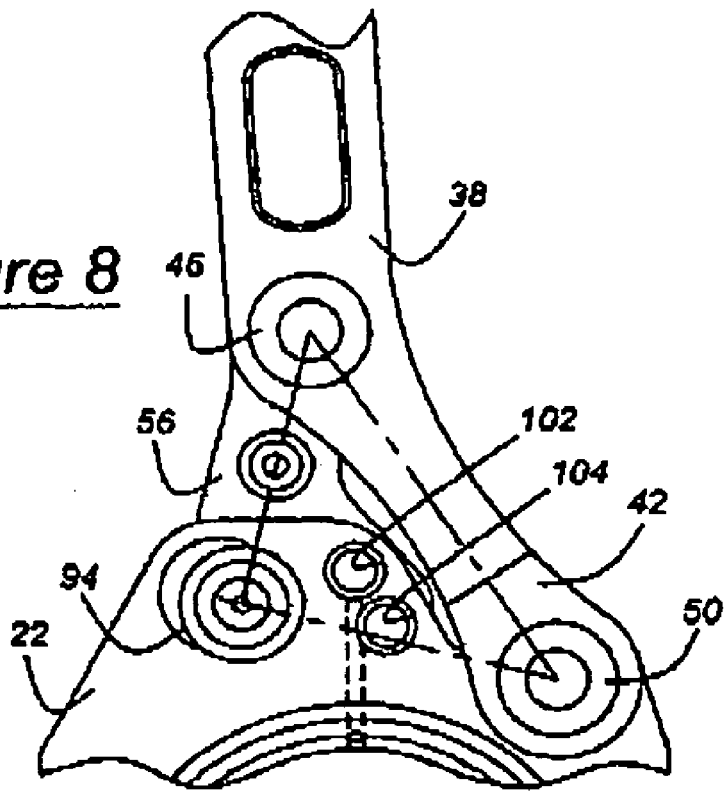
Figure 9:
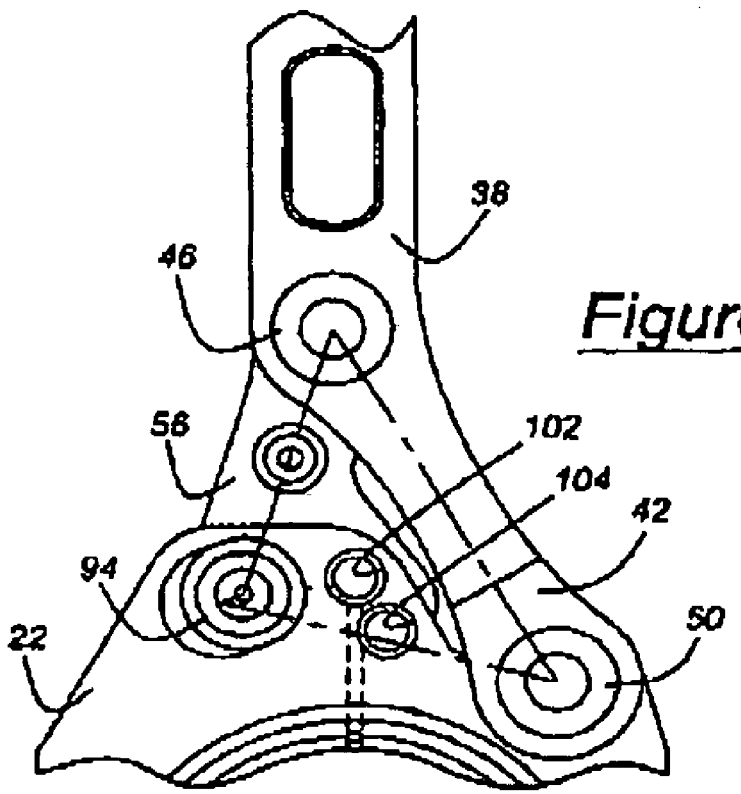

When connecting rod 10 is in the configuration shown in FIGS. 2 and 6, lock pins 115 extending from cartridges 110 housed within bores 102 and 104 need only resist the buckling forces imposed on connecting rod 10 by the motion of the rod within the engine. Thus, the forces which lock pins 115 need to accommodate are greatly reduced, compared with what would otherwise be the case. However, when lock pins 115 are withdrawn so as to allow change in the compression ratio, inertia forces cause the side motion of connecting rod 10 to buckle the four-bar link, and the action of the linkage will then cause rotation of eccentric 94 as shown in FIGS. 3 5, until the alternate compression ratio configuration is achieved, as at FIG. 6, at which point the lock pin 115 housed within the cartridge within bore 102 will be locked to low compression link 56.

Figure 17:
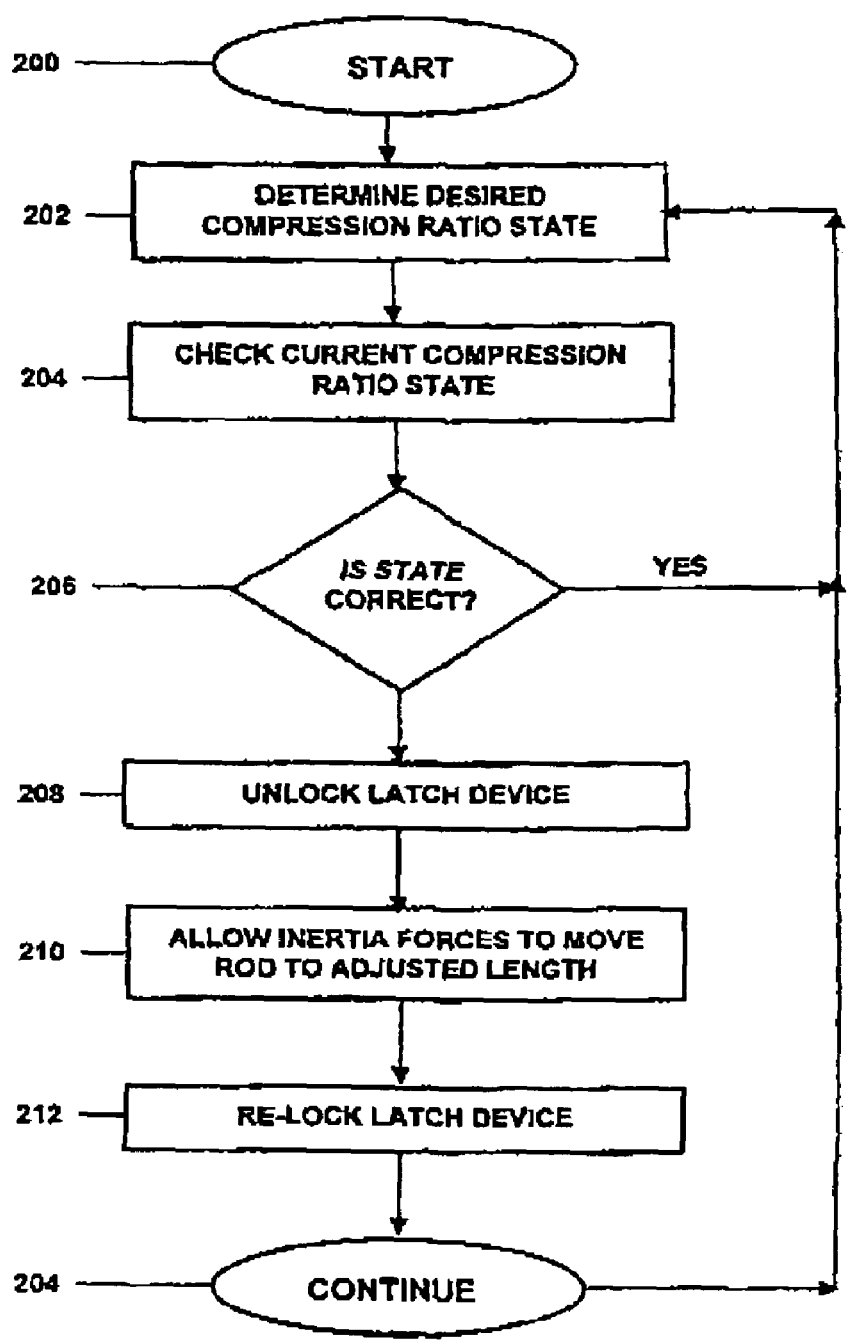
FIG. 17 illustrates a flowchart of a method according to one aspect of the present invention.

FIG. 17 illustrates a method according to the present invention for controlling an adjustable variable compression ratio connecting rod according to the present invention. The routine starts at 200 and moves 202 wherein the desired compression ratio state is determined. Those skilled in the art will appreciate in view of this disclosure that a variety of engine operating parameters may be used in a calculus to determine the desired compression ratio state. For example, the compression ratio may be lowered if the engine output is suddenly increased and a blower such as a supercharger or turbocharger is switched on. Similarly, the compression ratio may be lowered if engine knock is encountered. Conversely, compression ratio may be increased if the engine load is light such as at idle or part throttle. These details are beyond the scope of this invention. What is important is that the desired compression ratio state is determined at block 202. Thereafter, at block 204, the routine checks the current compression ratio state. This may be done by means of sensing as will be explained later in this specification. At block 206, the controller, which in this case preferably comprises an engine controller known to those skilled in the art and suggested by this disclosure, determines whether the desired state and the current state are the same. In other words, the controller determines whether the current state matches the desired state. If the answer is "Yes" at block 206, the routine cycles back to 202 and continues. However, if the answer is "No" at block 206, the latch device (such as pins 115 located within cartridges 110) is unlocked at block 208 and at block 210, the inertia forces are allowed to move the rod to the adjusted desired length. Thereafter, at block 212, the latch devices relock and the routine continues at block 214.

Figure 15:
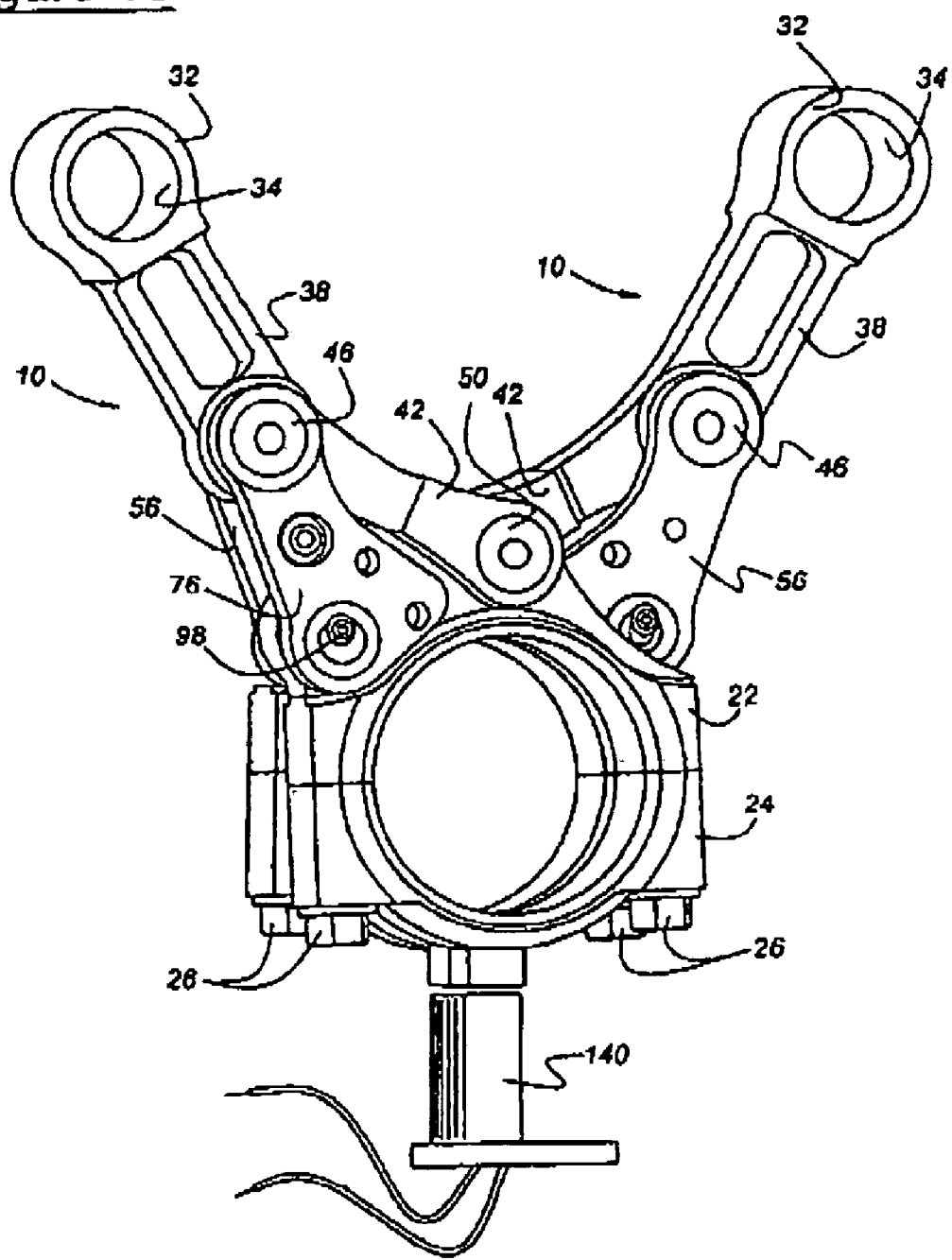
FIG. 15 shows a pair of connecting rods mounted side by side on a crank pin of an engine crankshaft while in a low compression ratio position.
Figure 16:
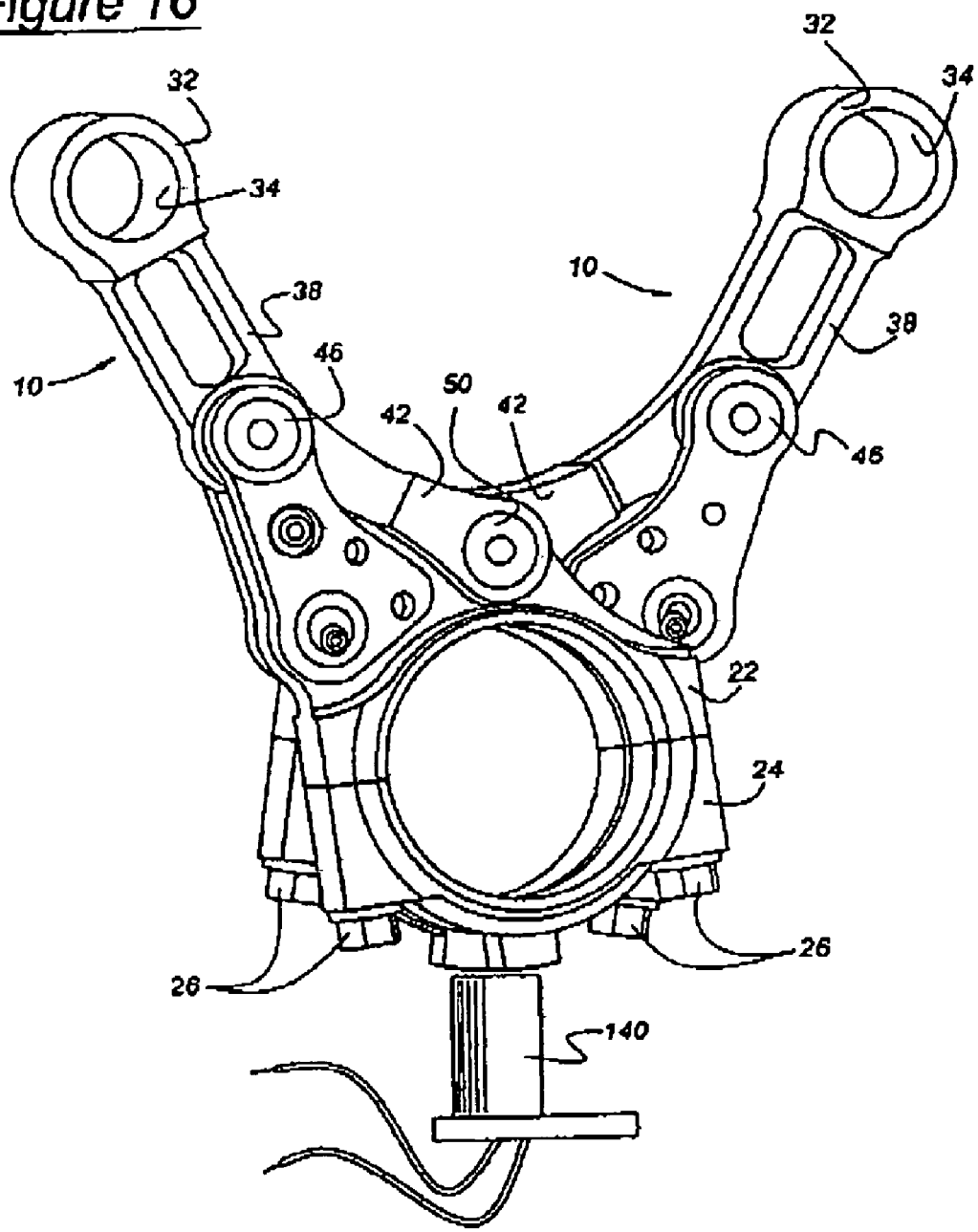
FIG. 16 shows the pair of connecting rods of FIG. 15 in a high compression ratio position.

FIGS. 15 and 16 show two connecting rods mounted in a configuration which is typical for a V-block engine. The connecting rods are shown in FIG. 15 as being in the low compression ratio setting; FIG. 16 shows the high compression ratio setting. Sensor 140 is a proximity sensor, such as a Hall Effect sensor, which creates a pulse as the connecting rods sweep past the sensor. When connecting rods 10 are in a high compression mode, the length of the pulse will be longer, than when the connecting rods are in the low compression mode. An engine controller (not shown) need only mark the crankshaft positions when the Hall Effect pulse begins and ends to determine the compression ratio state of the engine. And, this is true whether the Hall Effect sensor is determining the compression ratio state of either one or two connecting rods. For engines with a single connecting rod on each crank pin, the pulse phase, rather than the pulse length, will be determined with reference to the crankshaft position to determine whether the connecting rod is in the high or low compression ratio state.

Figure 13:
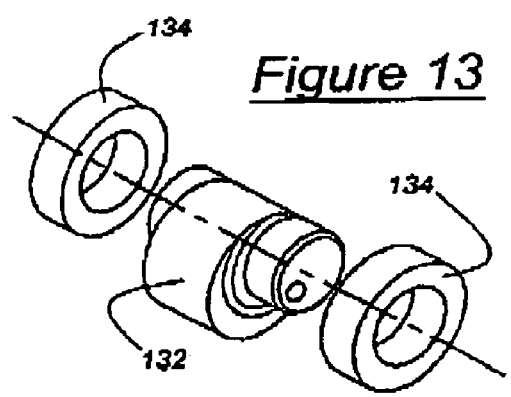
FIG. 13 shows an alternative embodiment of an eccentric and associated bushings according to the present invention.

FIG. 13 shows a alternative embodiment for eccentric 132 in which the eccentric comprises a single piece having two collars 134 applied thereon to accept the high and low compression links.

Figure 18:
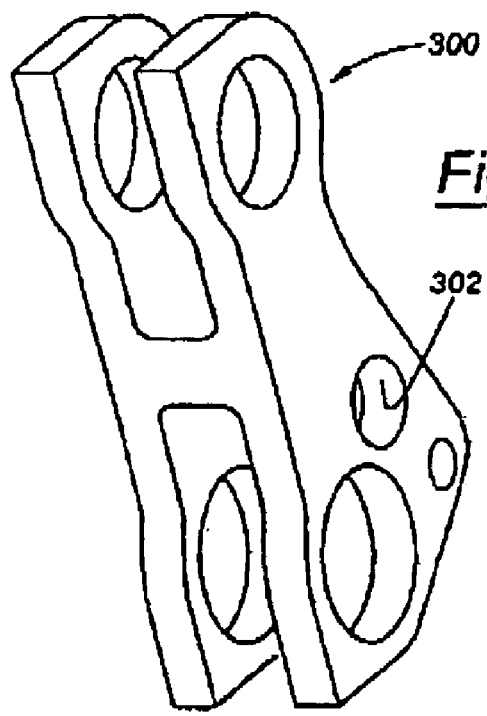
FIG. 18 shows a unitary toggle link according to one aspect of the present invention.
Figure 19:
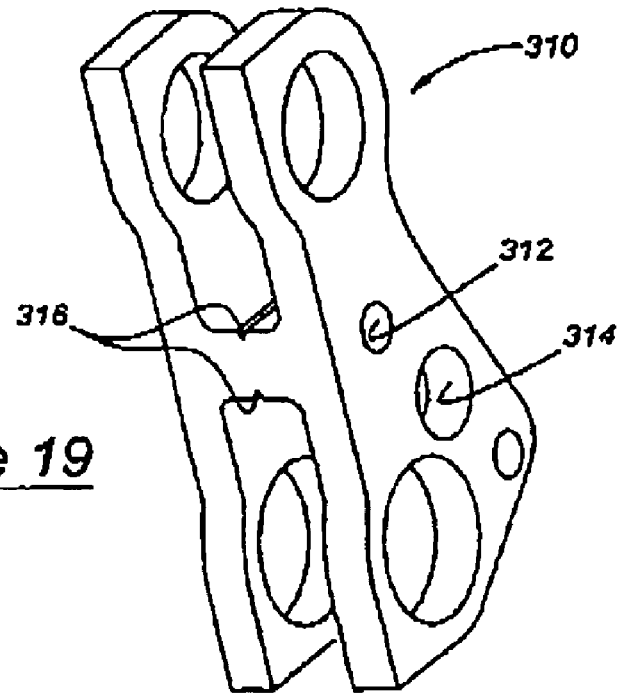
FIG. 19 shows a toggle link manufactured by cracking pre-machined parts according to one aspect of the present invention.

FIGS. 18 and 19 illustrate additional alternative embodiments for the toggle link. In FIG. 18, link 300 is of unitary construction. This necessitates that access bore 302 be provided to allow machining of the lock pin guide regions, such as guide region 66 (FIG. 14).

The toggle link depicted in FIG. 19 is formed initially as a unitary preform. After machining, the opposing sides of the perform are cracked apart with the aid of cracking notches 316. Bore 312 allows passage of a fastener to permit the separated halves to be mounted upon eccentric 94.

Although the present invention has been described in connection with particular embodiments thereof, it is to be understood that various modifications, alterations, and adaptations may be made by those skilled in the art without departing from the spirit and scope of the invention set forth in the following claims.

The invention claimed is:

1. A variable compression ratio connecting rod for an internal combustion engine, comprising:
   a large end adapted for attachment to a crankshaft;
   a small end adapted for attachment to a piston; and
   an adjustable four-bar system extending between and linking said large end and said small end, so as to permit the length of said connecting rod to be adjusted, wherein said four-bar system comprises a primary link extending between said large end and said small end, with said primary link being pivotably attached to said large end, and an adjustable toggle link having a first end pivotably attached to said primary link and a second end pivotably attached to an eccentric journaled within said large end, such that the rotational position of said eccentric determines the length of said connecting rod.

2. A connecting rod according to claim 1, wherein said eccentric is selectively positionable in a plurality of rotational positions.

3. A connecting rod according to claim 1, wherein the position of said eccentric is controlled by a latching device mounted within said large end, with said latching device being controllable so as to rotationally lock said eccentric.

4. A connecting rod according to claim 3, wherein said latching device comprises at least one lock pin mounted within said large end, with said at least one lock pin being controllably extendable into registry with at least one aperture formed in said adjustable toggle link, so as to rotationally lock said eccentric.

5. A connecting rod according to claim 3, wherein said latching device comprises a plurality of lock pins mounted within said large end, with said lock pins being controllably extendable into registry with a plurality of apertures formed in said adjustable toggle link, so as to selectively lock said eccentric into one of a plurality of rotational positions, with each of said rotational positions corresponding to a unique compression ratio.

6. A connecting rod according to claim 5, wherein each of said lock pins comprises a double-acting hydraulic plunger having a pin end, with said plunger being housed within a cartridge mounted in the large end of the connecting rod, with the plunger being acted upon by both a spring force and a hydraulic force for extending the pin, and hydraulic force alone for retracting the pin.

7. A connecting rod according to claim 6, wherein said plurality of apertures engaged by said lock pins each comprises a generally circular bore having an initial engagement portion with a non-circular configuration extending about and beyond said generally circular bore.

8. A connecting rod according to claim 3, wherein said latching device is actuated by engine lubricating oil supplied by passages formed in a crankshaft to which said connecting rod is attached.

9. A method for adjusting the length of a variable compression ratio internal combustion engine connecting rod having a small end or attachment to a piston and a large end for attachment to a crankshaft, with a primary link extending between said small end and said large end, with said method comprising the steps of:
   determining a desired compression ratio state for the connecting rod;
   detecting the contemporaneous compression ratio state of the connecting rod, and
   in the event that the detected state is not the desired state, unlocking a latch positioned between said large end and an adjustable toggle link extending between said primary link and an eccentric journaled to said large end, so as to allow inertia forces acting upon the connecting rod to cause the toggle link to change the rotational position of said eccentric, so as to cause the rotational position of the primary link with respect to the large end to change, thereby changing the effective length of the connecting rod; and
   re-locking said latch so as to maintain said connecting rod at the adjusted length.

10. A method according to claim 9, further comprising the step of detecting the contemporaneous compression ratio state of the said connecting rod following an adjustment of the connecting rod length.

11. A method according to claim 10, wherein the contemporaneous compression ratio state of said connecting rod is detected by sensing the proximity of a portion of the connecting rod to a sensor at a predetermined crankshaft position.

12. A variable compression ratio connecting rod for an internal combustion engine, comprising:
   a large end adapted for attachment to a crankshaft;
   a small end adapted for attachment to a piston by a wrist pin; and
   an adjustable four-bar system extending between the linking said large end and said small end, so as to permit the length of said connecting rod to be adjusted, wherein said four-bar system comprises a fixed length primary link extending between said large end and said small end, with said primary link being pivotably attached to said large end, and an adjustable toggle link having a first end pivotably attached to said primary link and a second end pivotably attached to an eccentric journaled within said large end, such that the rotational position of said eccentric and the resulting position of said toggle link determine the rotational position of said primary link with respect to said large end, so as to determine the length of said connecting rod.

13. A connecting rod according to claim 12, wherein said connecting rod is selectively adjustable to a plurality of lengths determined by a plurality of lock pins mounted within said large end, with said lock pins being hydraulically extendable into registry with a plurality of apertures formed in said adjustable toggle link, so as to selectively lock said eccentric into one of a plurality of rotational positions, with each of said rotational positions corresponding to a unique compression ratio.

14. A connecting rod according to claim 12, wherein said toggle link is unitary.

15. A connecting rod according to claim 12, wherein said toggle link is produced by cracking apart a unitary perform.

* * * * *